(12) United States Patent
Stamos (10) Patent No.: US 8,799,482 B1
(45) Date of Patent: Aug. 5, 2014

(54) DOMAIN POLICY SPECIFICATION AND ENFORCEMENT

(75) Inventor: Alexander Charles Stamos, San Carlos, CA (US)

(73) Assignee: Artemis Internet Inc., San Francisco, CA (US)

( * ) Notice: Subject to any disclaimer, the term of this patent is extended or adjusted under 35 U.S.C. 154(b) by 58 days.

(21) Appl. No.: 13/444,484

(22) Filed: Apr. 11, 2012

(51) Int. Cl.
*H04L 29/06* (2006.01)
*H04L 29/08* (2006.01)

(52) U.S. Cl.
CPC .................................. *H04L 29/0809* (2013.01)
USPC ................................. 709/227; 726/1; 726/22

(58) Field of Classification Search
None
See application file for complete search history.

(56) References Cited

U.S. PATENT DOCUMENTS

| | | | |
|---|---|---|---|
| 8,261,351 B1 * | 9/2012 | Thornewell et al. | 726/23 |
| 2004/0006706 A1 | 1/2004 | Erlingsson | |
| 2005/0015626 A1 | 1/2005 | Chasin | |
| 2007/0214503 A1 | 9/2007 | Shulman et al. | |
| 2009/0164582 A1 | 6/2009 | Dasgupta et al. | |
| 2010/0100957 A1 * | 4/2010 | Graham et al. | 726/22 |
| 2010/0191847 A1 | 7/2010 | Raleigh | |
| 2013/0239209 A1 | 9/2013 | Young et al. | |

* cited by examiner

*Primary Examiner* — Pramila Parthasarathy
(74) *Attorney, Agent, or Firm* — Van Pelt, Yi & James LLP (57) ABSTRACT

The specification and enforcement of domain policies is disclosed. Input including a second level domain is received. The second level domain is associated with a particular top level domain. A determination is made as to whether a resource associated with the second level domain is consistent with a policy associated with the top level domain. A responsive action is performed based at least in part on the determination.

22 Claims, 6 Drawing Sheets

DOMAIN POLICY SPECIFICATION AND ENFORCEMENT

BACKGROUND OF THE INVENTION

Securely using the Internet can require a great deal of vigilance and sophistication on the part of the end user. For example, many websites do not support the use of Hypertext Transfer Protocol Secure (HTTPS). A user asked to provide a password or other sensitive information to such a site does so at great risk of interception. Even if a website does support HTTPS, it is frequently the case that the burden is on the user to explicitly invoke it (e.g., by typing https://www.example.com). Further, servers are frequently misconfigured and as a result users are conditioned to ignore security warnings—leaving the users vulnerable to compromised and otherwise malicious websites as well. As another example, very few email messages are encrypted prior to transmission.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
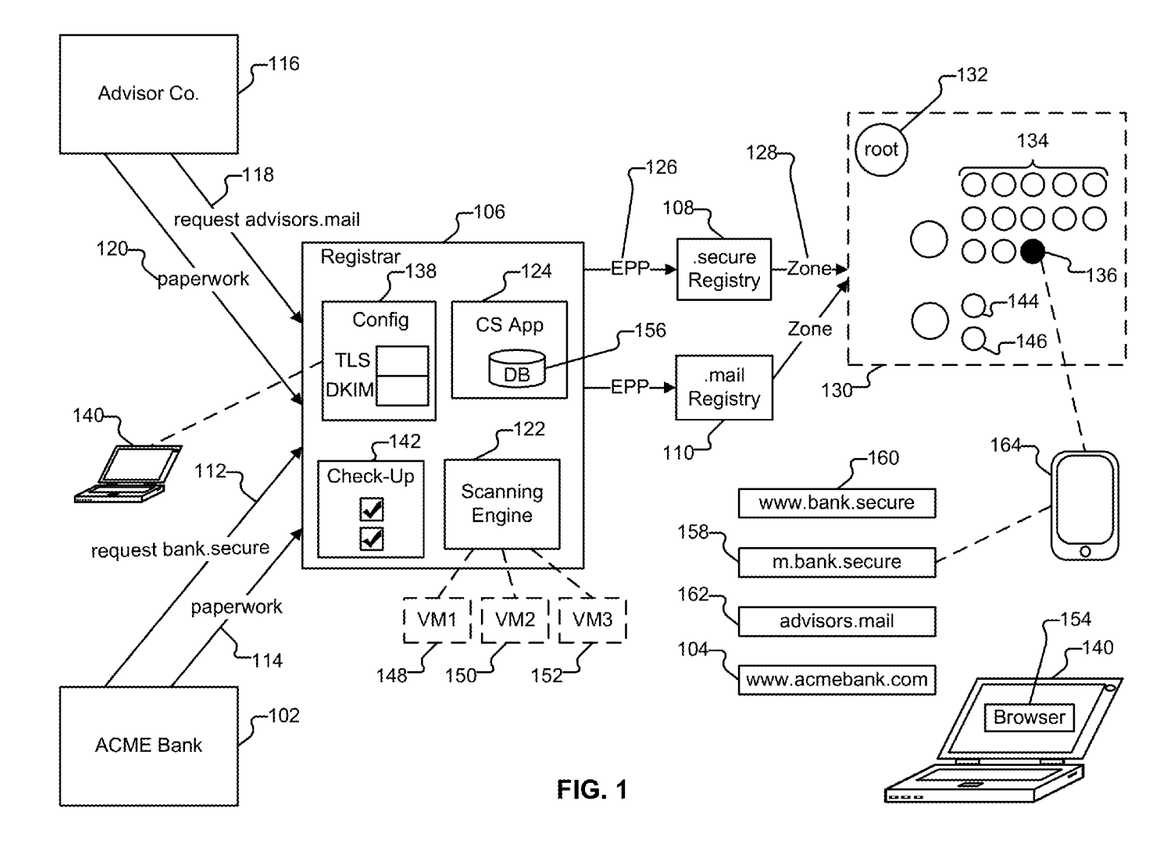
FIG. 1 illustrates an embodiment of an environment in which domain policies are specified and enforced.

FIG. 1 illustrates an embodiment of an environment in which domain policies are specified and enforced. In the example shown, a bank (102), "ACME Bank," has a website reachable at www.acmebank.com (104) that provides typical online banking services to users, such as Bob, who accesses the site with client 140.

Domain name registrar 106 is an organization that manages the registration of Internet domain names. Domain name registries 108 and 110 maintain databases of all domain names registered in the top level domains of ".secure" and ".mail," respectively. In the example shown, domain name registrar 106 and domain name registry 108 comprise a "vertically integrated registry," meaning that they are under control of the same entity. Domain name registry 110 is separately operated. Components such as scanning engine 122 and customer service application 124, both of which are described in more detail below, may be collocated with a registrar 106 (as shown) or a registry such as registry 108 or 110. Such components can also be provided by a third party, as applicable. For example, in some embodiments, customer service application 124 is under the control of registrar 106 but operates on a software-as-a-service (SAAS) platform. As another example, at least some of the services of scanning engine 122 are provided by a third party to several registrars and/or several registries. As yet another example, interfaces 138 and 142 can be incorporated by a third party into interfaces provided by registrar 106, such as through a portal or iframe elements.

As will be described in more detail below, .secure and .mail are examples of "higher trust" top level domains (TLDs). Also as will be described in more detail below, a higher trust TLD has associated with it a policy that defines a set of minimum requirements with which any site in the TLD must comply. More stringent requirements can be defined for second level/subdomains by their owners, also as described in more detail below. User applications, such as browser 154 installed on client 140, are configured to obtain the policies via Domain Name System 130 and to facilitate communications/transactions between client 140 and a resource in a higher trust domain only if the resource is compliant with the applicable policy. As another example, a mail exchanger can be configured to obtain copies of policies via DNS and to only accept mail from or send mail to domains in compliance with those policies.

Suppose ACME Bank would like to register the domain "bank.secure" so that its customers will know that when they access the bank's website (e.g. at https://www.bank.secure) or receive email messages from the bank (e.g., sent by admin@bank.secure), such communications will be secure. An administrator at ACME Bank submits a request (112) to registrar 106. In order to register a .secure domain, an applicant is required to submit documentation demonstrating that the applicant is legitimate. As one example, all applicants are required to sign a statement agreeing to comply with a code of conduct and acknowledging that DNS resolution services will be suspended if the applicant's servers do not comply with certain security requirements. As another example, as an entity professing to be a bank, ACME Bank is required to provide documentation (114), such as a notarized copy of the bank's charter. In various embodiments, different levels of validation are required for different types of applicants and/or based on the intended use of the domain. For example, any applicant requesting a .secure domain that includes the term "bank" (e.g., "firstnationalbank.secure") is required to provide more documentation than an applicant requesting a .secure domain that corresponds to the name of an individual (e.g., "JohnSmith.secure"). In various embodiments, the registration is placed in a HOLD state until identification validation procedures are completed successfully.

Also depicted in FIG. 1 is a company, "Advisor Co." (116), which provides financial advice to its clients. Advisor Co. would like (118) to register the domain "advisors.mail" (162). In some embodiments, applicants for .mail domains are required to adhere to the same documentation requirements as .secure applicants. However, different TLDs can also make use of different documentation requirements. For example, an applicant for a .mail domain may be asked to submit a statement (120) promising not to use the domain to send unsolicited email of any kind—a requirement that is not present for .secure applicants.

When the registration requirements have been met, the application is approved, payment is collected, and the applicant (e.g., a system administrator employee of ACME) is asked to access a configuration interface 138 and configure any desired policies, so long as they meet the minimum requirements for the TLD. Also when the registration has been approved, provisioning instructions are sent to the appropriate registry. For example, when ACME Bank's application is approved by a customer service representative via application 124, Extensible Provisioning Protocol (EPP) instructions 126 are sent to registry 108. In turn, registry 108 generates a zone file 128 that is pushed to Domain Name System (DNS) 130. In the example shown, node 132 is the root nameserver. A cluster 134 of servers is responsible for responding to DNS requests for .secure. As will be described in more detail below, in some embodiments, at least one DNS server for .secure (i.e., server 136) is instrumented and performs statistical sampling of the DNS requests it receives.

Similarly, when the .mail registration requirements have been met by Advisor Co., an administrator for Advisor Co. is asked to access configuration interface 138 and configure any desired policies. EPP instructions are sent to registry 110 which in turn generates a zone file that is pushed to DNS 130. In the example shown, nameserver 144 is authoritative for the ".mail" TLD and nameserver 146 is authoritative for a reserved zone "_policy.mail," described in more detail below.

Policy Configuration Interface

Figure 2:
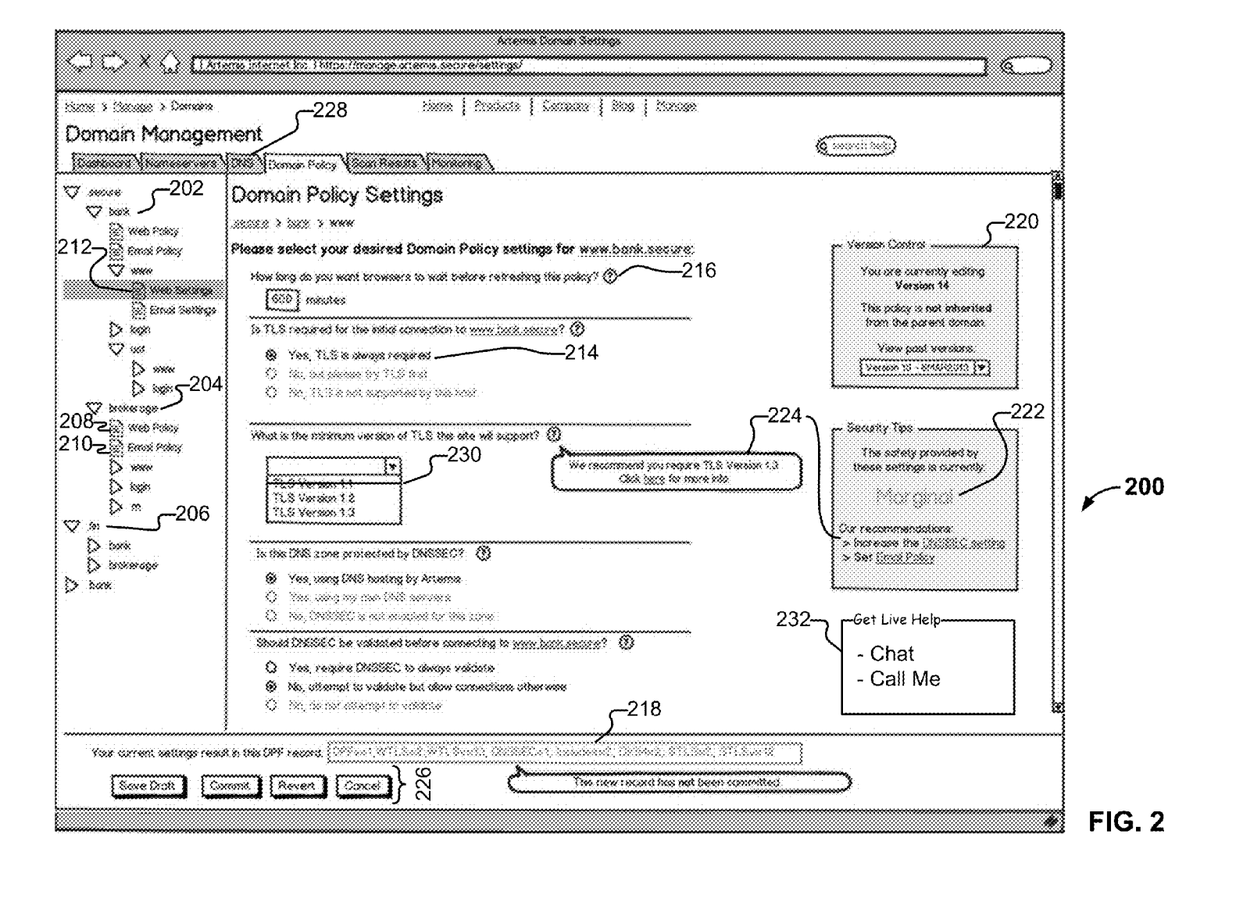
FIG. 2 illustrates an embodiment of an interface, as rendered in a browser, for specifying a domain policy.

FIG. 2 illustrates an embodiment of an interface, as rendered in a browser, for specifying a domain policy. In the example shown, a system administrator employed by ACME Bank (hereinafter "Alice") is configuring a set of policies that will be enforced against systems reachable via bank.secure, such as mail.bank.secure and www.bank.secure.

As illustrated in interface 200, ACME Bank has successfully registered domains in several TLDs, including bank.secure (202), brokerage.secure (204), and bank.fin (206). Each of the TLDs (e.g., .secure, .fin) is a higher trust TLD and supports policy enforcement. As explained above, each TLD can make available an interface for configuring policies, or an entity such as registrar 106 can contract to provide policy configuration services on behalf of multiple TLD/registries.

For each of the domains shown in FIG. 2, Alice can specify policies that will be enforced for web connections (e.g., by clicking on link 208), email connections (e.g., by clicking on link 210), and any other appropriate types of connections, such as FTP (not shown). Alice is currently configuring the policy that will apply to connections involving www.bank.secure (212). A policy is composed from one or more "entries"—each of which defines a rule applicable to the identity of the organization, or connections to resources (such as servers). One example entry is a requirement that TLS be used to secure all communications with www.bank.secure (214). For each configurable option, help can be accessed by clicking on the accompanying help icon (e.g., 216). In various embodiments, policy settings that do not meet the minimum standards required by the TLD are crossed out, greyed out, or otherwise not available (e.g., are not shown at all). For example, suppose the TLD .secure has as a minimum requirement that TLS Version 1.2 (or higher) be used. Alice's ability to select TLS Version 1.1 is removed accordingly (230). If Alice has any questions, she can (e.g., subject to the level of support she has contracted for) obtain real time help configuring her policies from a customer service representative by selecting the appropriate option in region 232.

In region 218, the configured policy is displayed using the syntax of the "Domain Policy Language" described in more detail below.

Administrative information, such as versioning information, is displayed in region 220. Feedback as to the security of the current policy settings (222) and recommendations for improvement are also displayed (224). Also, Alice can modify DNS and nameserver settings by selecting one of the appropriate tabs (e.g., tab 228). In some embodiments, the DNS and nameserver tabs will not be functional for Alice's domains and will be absent or greyed out in the interface, for example, where the provider of interface 200 does not offer such services.

Finally, Alice can commit her policy, revert to a previous version, cancel any changes, or save her changes as a draft by selecting the appropriate button in region 226. In some embodiments, Alice is also offered a button that will allow her to test ACME's servers against a new policy, prior to the policy being enforced. Alice can also run on-demand tests, and policies applicable to all domains in the TLD may also require that periodic testing be performed for all domains. In various embodiments, owners of higher trust domains pay for monitoring services, such as by paying registrar 106 a set amount per test or paying for a year of testing services.

Policy Enforcement Verification Interface

Figure 3:
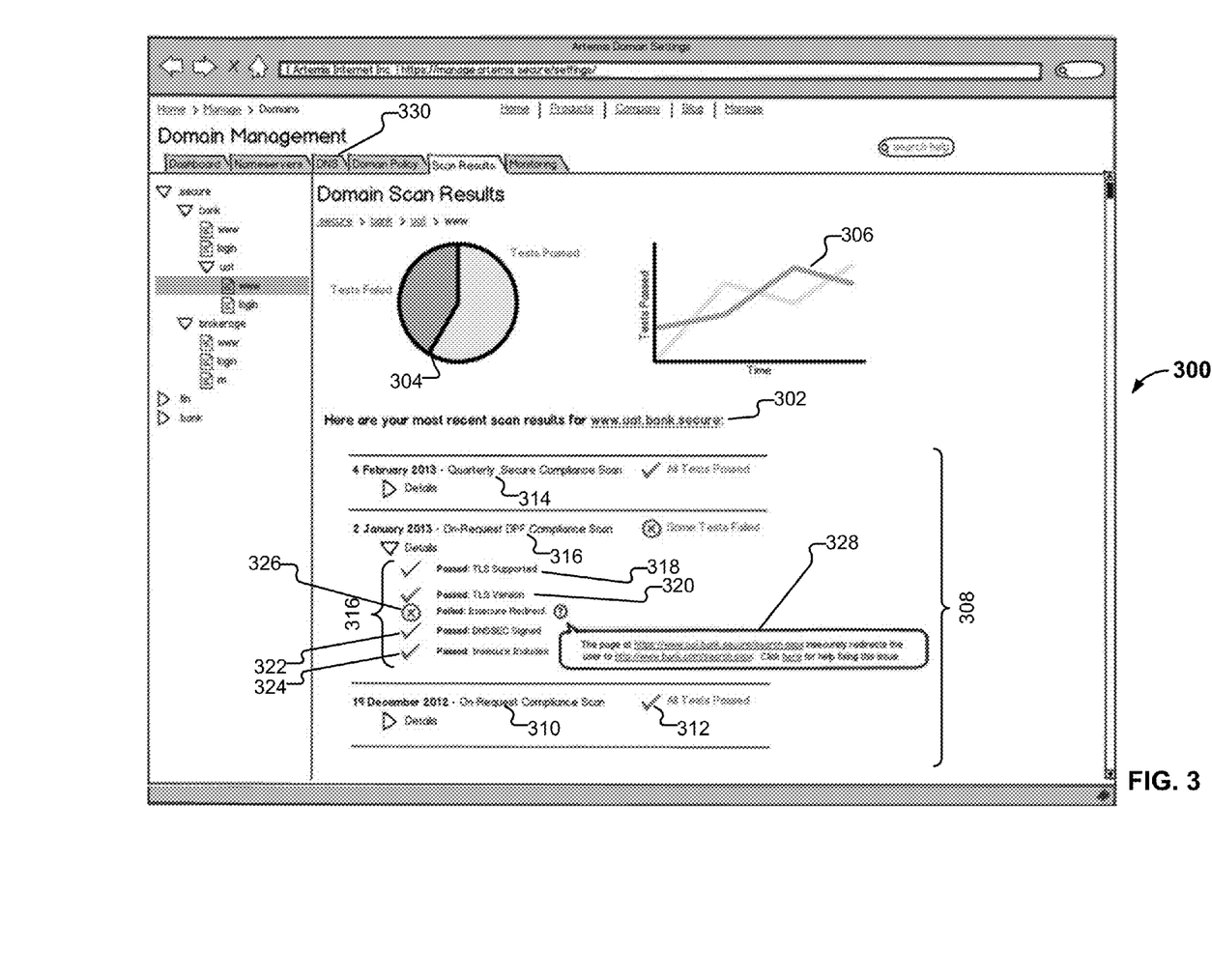
FIG. 3 illustrates an embodiment of an interface, as rendered in a browser, for verifying enforcement of a domain policy.

FIG. 3 illustrates an embodiment of an interface, as rendered in a browser, for verifying enforcement of a domain policy. In the example shown, Alice is viewing the results of a scan of the site, "www.uat.bank.secure" (302) performed by scanning engine 122. Various charts are included, showing the percentage of passes/fails (304) and the pass/fail trend over time (306).

Included in region 308 are summaries of three scans that were performed. Specifically, on Dec. 19, 2012, Alice requested a scan (310) and the site was in full compliance with the applicable requirements (312)—i.e., any minimum requirements set by .secure, and any additional requirements specified by Alice in interface 200. On Feb. 4, 2013, a scan of the site was automatically performed (314) on behalf of the .secure TLD regarding its minimum requirements. As shown, .secure requires quarterly scans of all .secure sites. Automatic scans can be performed with other frequencies, and the frequency of scans can be made dependent on factors such as whether the site is used by a corporate entity (e.g., more frequent scans) or an individual (e.g., less frequent scans). Automatic scans can also be triggered based on events, such as a requirement that a site be rescanned any time a policy change is committed. In various embodiments, domains to be scanned are added to a queue and handled by scanning engine 122 as resources are available. Scan results are saved, such as in database 156, which also includes other information about the domains and can be hosted by registrar 106, customer service application 124, a third party, or can be spread across multiple databases, as applicable.

On Jan. 2, 2013, Alice requested that a scan be performed, details of which are presented in region 316. As indicated in the title, "On-Request DPF Compliance Scan," the scan being performed pertains to the policy specified by Alice in an interface such as interface 200. As shown, at the time the scan was performed, the site (www.uat.bank.secure) required TLS (318), used an approved version of TLS (320), its DNS information was DNSSEC signed (322), and the content did not include any insecure includes (324). The site failed one test (326) because a page protected by HTTPS redirected to a page that used unencrypted HTTP. Detail regarding the failure, as well as instructions for correcting the problem are presented in region 328.

The scans summarized in interface 300 were performed at the direction of scanning engine 122. As illustrated in FIG. 1, scanning engine 122 makes use of virtual machines 148-152. In various embodiments, the virtual machines are loaded as needed, at geographically diverse locations, and can execute on third party hardware, such as is provided by one or more third party cloud computing vendors. Scanning engine 122 can also perform one or more scans itself and virtual machines 148-152 are omitted as applicable.

A variety of scans can be performed in addition to the TLD-required policy scan and additional requirements specified for the domain using the Domain Policy Framework (DPF). For example, traditional malware scans can be performed against the content available at the site being analyzed.

Domain Policy Language

Overview

Top level (and second level/sub domains, as applicable) can communicate policies to applications, such as a browser application 154 running on client 140, using the Domain Policy Framework (DPF). The DPF uses DNS (130) to publish policies. As one example, the record itself can be extended to support the inclusion of additional information. As another example, DPF policies (also referred to herein as "records") can be separately stored in reserved zones under the control of participating TLDs. For a domain of pattern domain.tld, the domain policy would be stored as a TXT record for domain._policy.tld. For the example domain of advisors.mail, the DPF record would thus be stored under advisors._policy.mail. The use of the "_policy" second level domain (or other appropriate domain) allows for the deployment of DPF without ICANN's permission. It also forces TLD registries (e.g., 108 and 110) to use alternate DNS secondaries to publish the _policy zone. TLD registries can also publish a blank policy using only the DPFv entry. This will provide maximum compatibility and allow for DPF records to be published by the incumbent TLDs.

A DPF aware client, such as browser application 154, examines the domains it receives as input and, when it encounters a TLD that it knows to be a higher trust TLD, makes two parallel DNS requests, one for the host (e.g., www.bank.secure) and one for the policy (e.g., www.bank._policy.secure). DPF TXT records are cached throughout the DNS system in parallel to their associated host records.

Example Syntax

The following is one example of a syntax for properly formatted DPF records. The example syntax is human readable and can be modified or adapted as applicable. A DPF record contains a list of name value pairs bonded by the ASCII=sign. The pairs are separated by semi-colons with an optional trailing whitespace. As an example:

(1) name1=value1;name2=value2;name3=value3;

In example (1), an optional space is present between the second and third pairs, and the semi-colon is present behind the final pair.

The DPF record begins with a version field:

(2) DPFv=1

The other name value pairs can be in any order, and any tokenizing is insensitive to the order of values.

The characters in the name fields and the separating characters are encoded as 7-bit ASCII. Except for the organization identification field, all of the characters in the value field are also encoded as 7-bit ASCII. Interpretation of all fields is case insensitive, but case sensitivity can be preserved (e.g., for characters in free text fields) in situations where the value is displayed to a user. Names may be of length of up to eight consecutive alphanumeric characters. Values can be of the following four types:

Booleans: Encoded as a 1 for TRUE and 0 for FALSE. No other values are valid in a Boolean.

Integers: A 32-bit unsigned integer value between 0 and $2^{32-1}$, expressed in BASE10 using ASCII Arabic numerals.

BASE64 Encoded

Free Text Fields: Free text delimited by ASCII double quote characters. A free text field can contain upper-case alphabetical, lower-case alphabetical, and numeric characters. Some special characters are allowed, such as space and underscore.

DPF Entries

A name-value pair for which the value is of either the Boolean or Integer type is also referred to herein as a "DPF entry." DPF entries correspond to a single security action that can be taken by a DPF client. Boolean TRUE values are more secure than FALSE values. Integer entries increase in value as the expected security benefit increases. In situations where future intermediate values may be necessary, values can be reserved for future use.

A set of DPF entries published by a domain is also referred to herein as a "DPF policy." DPF versions are iterative, and the meanings of entry names assigned in previous versions are not modified by subsequent versions.

Entries can exist for many types of protocols (e.g., HTTP, SMTP), and such entries can be mixed together in shared policies. Clients are configured to ignore any entries that they do not understand, and continue to implement the entries they do understand. The following are tables of example DPF entries.

TABLE 1

Example Network and Identity Entries:

| Entry Name | Value Type | Description | Examples |
|---|---|---|---|
| DPFv | Integer | DPF version. | DPFv = 1: DPF version 1. |
| DNSSEC | Integer | Level of DNSSEC verification required to connect to a host in this domain. This value is | DNSSEC = 0: Zone not signed, allow for DPF updates using unsigned records. DNS SEC = 1: Zone is signed. Upon failure of DNSSEC verification, retry |

TABLE 1-continued

Example Network and Identity Entries:

| Entry Name | Value Type | Description | Examples |
|---|---|---|---|
| | | typically in use as a base entry included in a DPF client. | with built in resolver. Allow for insecure DPF and allow connection to proceed.<br>DNSSEC = 2: Zone is signed, attempt to re-request. Do not allow for insecure DPF, allow for connection to proceed.<br>DNSSEC = 3: Zone is signed, attempt to re-request. Do not allow for insecure DPF, do not allow for connection after DNSSEC failure. |
| ORG | Text | A text field containing the verified identity of the domain owner. Supports I18N and alternate character sets. | ORG = "ACME Bank Inc." |
| ORGV | Integer | The level of verification performed by the registry on the organization's identity. Higher values indicate a greater level of verification. This value is surfaced by the DPF client to the end-user via a UX mechanism. | ORGV = 0: No verification performed. Self-identified.<br>ORGV = 2: Personal identification of an individual.<br>ORGV = 5: Strong enterprise verification, equal to or better than Extended Validation Certificates. |

TABLE 2

Example Email Related Entries:

| Entry Name | Value Type | Description | Examples |
|---|---|---|---|
| STLS | Integer | Type of TLS protection provided at the mail exchanger. | STLS = 0: No TLS required.<br>STLS = 1: STARTTLS supported on normal SMTP Port.<br>STLS = 2: "Wrapped" SMTPS available on port 587. |
| STLSv | Integer | Minimum required TLS version. | STLSv = 12: TLS 1.2 minimum. |
| NOEURI | Boolean | Are valid URIs allowed in emails from this domain? | NOEURI = 0: URIs are allowed.<br>NOEURI = 1: URIs are not allowed, reject messages containing URIs. |
| ESIG | Text | Expected email signature algorithm for messages received from this domain. | ESIG = "": No signatures expected.<br>ESIG = "SMIME3": Expect mail signed with SMIME v3 (RFC 2663).<br>ESIG = "OPGP": Expect mail signed with OpenPGP (RFC 4880). |
| DKIM | Boolean | Is DKIM enabled for this domain? | DKIM = 1: Require DKIM on all mail received from this domain. |

TABLE 3

Example WWW Related Entries:

| Entry Name | Value Type | Description | Examples |
|---|---|---|---|
| HTLSv | Integer | Minimum required TLS version for initial HTTP connection. 0 means no TLS required. | HTLSv = 0: No TLS required, connect using HTTP.<br>HTLSv = 13: TLS 1.3 required. Initially connect using HTTPS, reject all versions of TLS less than 1.3. |
| INCLD | Boolean | Are pages in this domain restricted from including content from non-TLS protected HTTP endpoints? | INCLD = 0: Normal include policy.<br>INCLD = 1: Non-executable includes allowed over HTTP, such as images.<br>INCLD = 2: All includes must be served over HTTPS. |

TABLE 3-continued

Example WWW Related Entries:

| Entry Name | Value Type | Description | Examples |
|---|---|---|---|
| | | | INCLD = 3: All includes must be served from this TLD.<br>INCLD = 4: All includes must be served from this exact domain. |
| TLSEV | Integer | Is an Extended Validation certificate required on servers in this domain? | TLSEV = 0: No requirement for EV certificate.<br>TLSEV = 1: EV certificate or DNSSEC DANE published key.<br>TLSEV = 2: EV certificate always required. |
| 3CKIES | Boolean | Are third party cookies allowed to be set by sites running on this domain? | 3CKIES = 0: Normal third-party cookie policy.<br>3CKIES = 1: Do not allow third-party cookies. |
| NOPLGINS | Text | A text string containing plugins that are not allowed to run on this domain. | NOPLGINS = "": Normal plugin policy.<br>NOPLGINS = "FLASH; SILVERLIGHT; JAVA":<br>No Flash, Silverlight or Java on this site.<br>NOPLGINS = "ALL": No browser plugins allowed. |

Additional examples of content-oriented DPF entries include ones permitting or disallowing the use of iframes, JavaScript, and/or cross-domain includes in web pages rendered by browser 154, and requiring email messages to be rendered in plaintext only by a mail client.

Base and Resultant Policies

As explained above, DPF policies are delivered via DNS. In situations where the DPF is intentionally blocked by an attacker, the DPF record is modified, and/or where there is an inadvertent failure of DNSSEC, end-users are still able to connect securely to the requested domain through the use of a default policy stored with the DPF-aware application. Each domain registry participating in the DPF can publish, out of band, the minimal requirements of their TLD. One example of a default policy is as follows:

(3) DPFv=1;HTLS=12;DNSSEC=2;STLS=1

If browser 154 is not able to receive or validate a DPF record, the browser falls back on the default policy accordingly. If the browser does receive a DPF record (e.g., via a DNS request to www.bank._policy.secure), in some embodiments it calculates a resultant policy. One way to determine a resultant policy is through the use of monotonically increasing values in order of security; the larger of the two values is used. As one example:

(4) Base Policy: DPFv=1;HTLS=12;DNSSEC=2; STLS=1;

(5) Received Policy: DPFv=2;HTLS=13;STLS=0;

(6) Resultant Policy: DPFv=2;HTLS=13;DNSSEC=2; STLS=1;

TLD Redirection

HTTP Strict Transport Security (HSTS) can be used by websites to signal to user-agents their desire to only be accessed using HTTPS. In some embodiments, HSTS is extended to perform an additional function: to allow for permanent redirects from one TLD (e.g., ".com") to another (e.g., ".secure").

Detecting New Domains

As described in conjunction with FIGS. 1-3, Administrator Alice has successfully registered the bank.secure domain and specified additional ACME Bank specific requirements using the DPF. She has also been able, via interface 300, to confirm that various subdomains (e.g., www.uat.bank.secure) are in compliance with both the requirements of the .secure TLD and ACME Bank's specific requirements.

Now suppose that, without Alice's knowledge or permission, another ACME Bank administrator, Charlie, brings a new server online. The marketing department at ACME Bank cajoled Charlie into setting up a mobile-oriented website at http://m.bank.secure (158) for use in a promotion. The site is linked to from ACME Bank's main website at http://www-.bank.secure (160). The mobile site is not compliant with either ACME Bank's DPF policy, or the minimum standards required by the .secure TLD. For example, site 158 does not support TLS at all. As another example, the mobile site is hosting copies of an executable file that users are encouraged to download and install on their phones, in contradiction to an ACME Bank DPF entry that forbids the presence of executables on its websites.

In various embodiments, registrar 106 provides DNS hosting services to its customers. For example, Alice can configure such services by selecting tab 330. In such a scenario, scanning engine 122 can be made aware of a new site, such as site 158 immediately and can immediately enforce its adherence to the TLD and DPF policies. It can also be the case, however, that ACME Bank makes use of third party DNS hosting services. If so, scanning engine 122 might be unaware that the mobile site 158 exists, and thus does not know that initial and periodic scanning of the site should be performed.

As will be described in more detail below, DNS requests can be monitored to determine a list of sites that should be scanned by scanning engine 122.

Figure 4A:
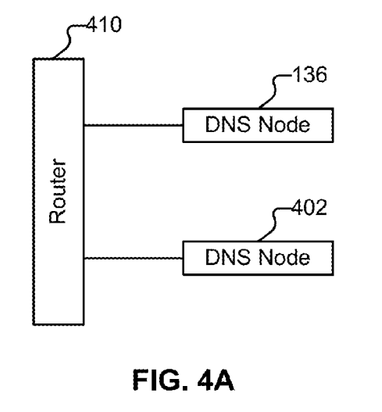
FIG. 4A illustrates an embodiment of an environment that includes a nameserver.

FIG. 4A illustrates an embodiment of an environment that includes a nameserver. In the example shown, nameserver 136 and nameserver 402 are both members of the cluster of servers 134 responsible for responding to DNS requests for .secure. They are in communication with Anycast router 410. As will be described in more detail below, nameserver 136 is instrumented to perform statistical sampling on the DNS requests it receives and provide information to a policy enforcement system that includes a scanning engine 122.

Figure 4B:
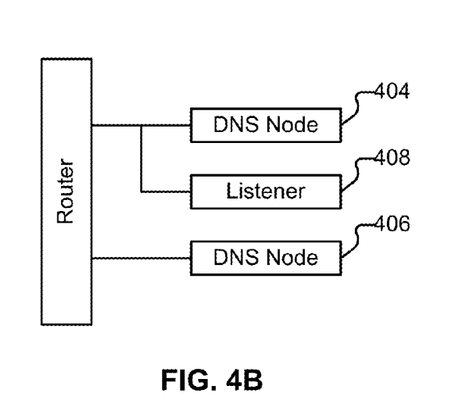
FIG. 4B illustrates an embodiment of an environment that includes a nameserver.

FIG. 4B illustrates an embodiment of an environment that includes a nameserver. In the example shown, nameservers 404 and 406 are typical nameservers and are not instrumented to perform statistical sampling. Instead, such sampling is performed by a listener 408, which runs packet analysis software such as SNORT and is configured to sniff UDP 53 traffic. Listener 408 provides information to scanning engine 122 and includes components such as components 414-420. In various embodiments, multiple listeners are used, such as for load balancing reasons.

Figure 4C:
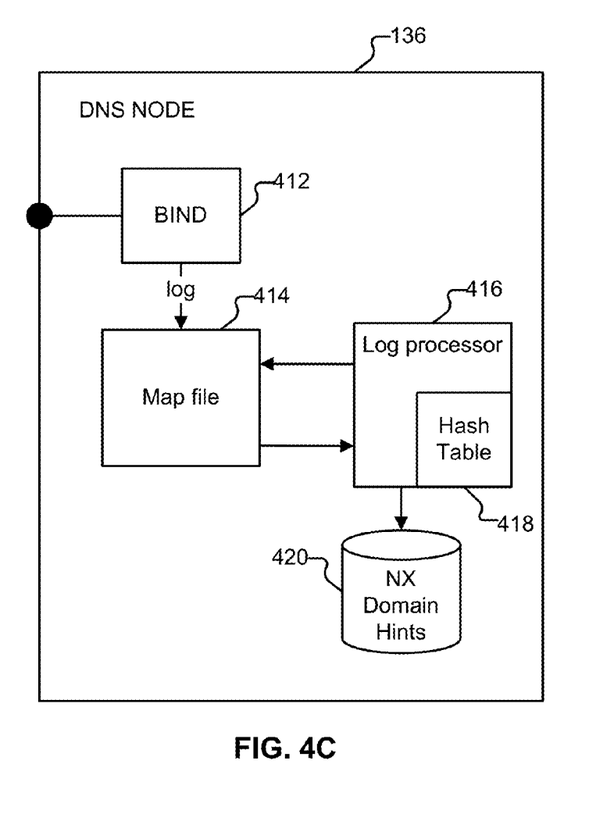
FIG. 4C illustrates an embodiment of a nameserver.

FIG. 4C illustrates an embodiment of a nameserver. Specifically, FIG. 4C depicts an embodiment of nameserver 136. Nameserver 136 is configured to run typical DNS software such as BIND (412). Nameserver 136 is further configured to log the DNS requests it receives to a map file 414. A log processor 416 uses a hash table of known domains 418 (e.g., including "bank.secure") to evaluate the log. When nameserver 136 receives a DNS request for a domain that is not represented in hash table 418, it generates an alert and sends it to scanning engine 122 (or other appropriate destination, such as customer service application 124). Further, if the request is for an NXDOMAIN, log processor 416 adds the domain to list 420. If the domain is already present in list 420, a count for the domain is increased. Once the count for a given domain in the NXDOMAIN list exceeds a threshold (e.g., as determined by log processor 416), nameserver 136 also sends a report (e.g., to scanning engine 122). The reports sent by nameserver 136 inform the scanning engine that domains exist (or are likely about to exist, based on a sufficient number of NXDOMAIN requests) that should be scanned.

Hash table 418 and NXDOMAIN list 420 can be maintained in a variety of formats. Further, a variety of techniques can be used to keep the information in hash table 418 current. For example, registrar 106 (or registry 108, or another system) can send a current list of known domains to nameserver 136 once a day.

One reason for NXDOMAIN requests is that end users, who are used to typing ".bank" or ".secure" to reach certain businesses with whom they transact may erroneously believe that other businesses can also be reached using those TLDs. For example, another bank, "Beta Bank," may not yet have obtained a .secure address. In various embodiments, if enough NXDOMAIN requests are received by nameserver 136 for a given domain, customer service application 124 is alerted. A customer service representative can use the alert for lead generation purposes—suggesting to representatives of Beta Bank, for example, that obtaining a betabank.secure address and/or a beta.bank address would be a desirable thing to do, using the number of NXDOMAIN requests as evidence.

Figure 5:
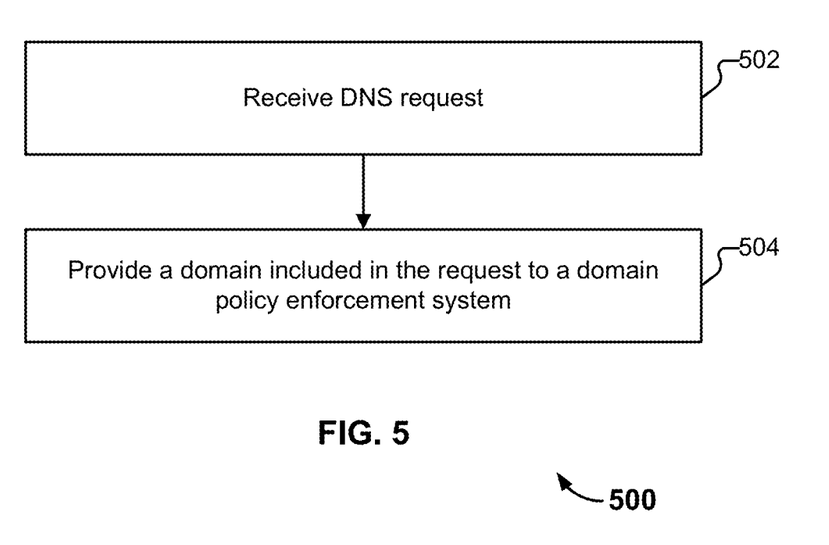
FIG. 5 illustrates an embodiment of a process for determining that a domain should be processed by a domain policy enforcement system.

FIG. 5 illustrates an embodiment of a process for determining that a domain should be processed by a domain policy enforcement system. In some embodiments process 500 is performed by nameserver 136. In other embodiments process 500 is performed by listener 408, or by a combination of multiple devices working in combination.

The process begins at 502 when a DNS request is received. As one example, suppose "Dave," an owner of cellphone 164, has come across the promotion concocted by the ACME Bank marketing department. He uses his phone to access site 160 and clicks on a link directing him to site 158. When he does so, phone 164 makes a DNS request for m.bank.secure which is ultimately passed on to nameserver 136. The request is added to map file 414 and received by log processor 416 at 502.

Log processor 416 compares the received domain to its hash table 418 and determines that the domain is new. Accordingly, at 504 log processor 416 sends an alert to registrar 106, which adds the domain to database 156 and places the domain into the queue of scanning engine 122. In some embodiments, additional actions are taken, such as by registrar 106 sending an email to an Alice alerting her to the detection of a new domain. Rules governing how often scanning engine 122 should scan newly identified domains, and whether multiple instrumented nameservers must have seen a domain prior to it being added to the queue can be specified.

In some embodiments, log processor 416 is configured to capture full logs and aggregate them along with the logs of other nameservers using Apache Hadoop. In such a scenario, rather than log processor 416 generating alerts and sending them to registrar 106, a separate log processor (not collocated on nameserver 136) performs those tasks.

Figure 6:
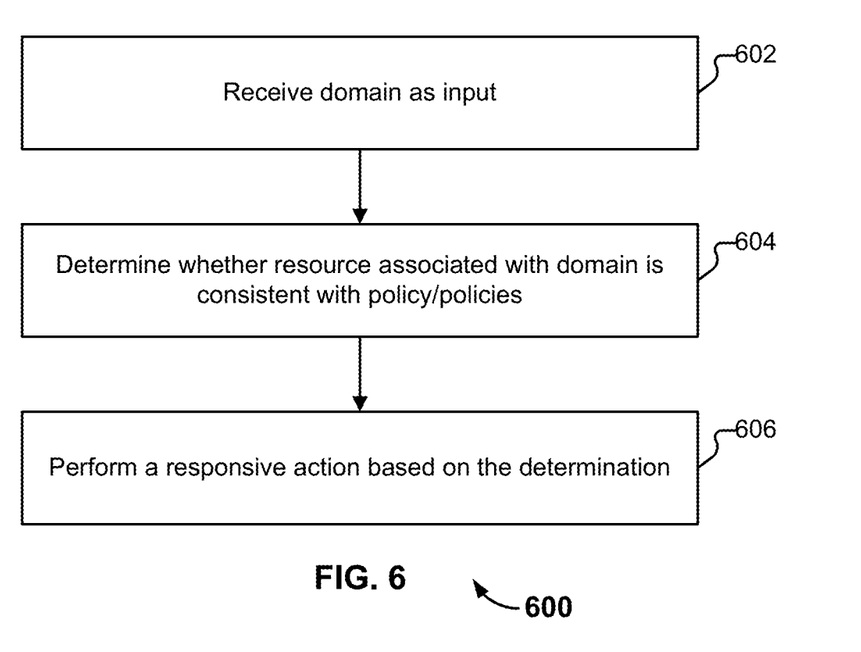
FIG. 6 illustrates an embodiment of a process for performing domain policy enforcement.

FIG. 6 illustrates an embodiment of a process for performing domain policy enforcement. In some embodiments process 600 is performed by registrar 106 (or various components thereof, working in cooperation). In other embodiments, process 600 is performed by scanning engine 122 and/or by scanning engine 122 working in cooperation with other components, such as virtual machines 148-152 or third party malware scanners.

The process begins at 602 when a domain is received as input. As one example, a domain is received as input in response to Alice selecting a "Scan my site now" button provided by interface 124. As another example, a domain is received as input as part of a recurring job, such as a weekly job that scans all .secure sites. As yet another example, a domain is received as input when log processor 416 identifies a new domain.

At 604, a determination is made as to whether a resource associated with the domain is consistent with one or more policies. As one example, suppose a minimum requirement for a .secure domain is that all webservers support TLS version 1.3, whenever encryption is used. In this scenario, an example of a resource associated with the domain is the serving of web pages by the webserver. If the pages are served by a server that supports TLS version 1.3, then the resource is consistent with the TLD's policy. As another example, a determination can be made as to whether the zone is DNSSEC signed. In some embodiments, base checks are performed prior to, or at the outset of the processing performed at 604. For example, whether the domain resolves and whether or not it responds to pings are determined.

Suppose ACME Bank has a more stringent requirement than the .secure requirement. Specifically, suppose ACME Bank requires that all web traffic be encrypted. Again, at 604, a determination is made as to whether pages served by ACME Bank via its webserver are encrypted. In various embodiments, compliance with multiple policies (e.g., the TLD policy and the domain's DPF policy) is tested for at 604.

At 606, a responsive action is performed based on the determination made at 604. As one example, suppose the resource (e.g., the web server) is found to be compliant with all policies at 604. In such a scenario, a report of success is sent to an administrator at 606. Other actions can also be taken, such as updating database 156 or displaying a result in interface 142. If the resource is not compliant, a variety of actions can also be taken. For example, an error report can be sent to an administrator of the site. As another example, the administrator can be asked to load an interface such as interface 300 from which the administrator can receive help in correcting the problem and performing re-tests to confirm the problem is resolved. The administrator can be given a finite amount of time to remedy the problem (e.g., one hour or twelve hours) after which time DNS query services will be suspended until the problem is resolved. As another example, for entities such as banks, a series of escalations can take place (e.g., sending an email, then calling phone numbers in a particular order) until acknowledgement is received from the domain holder that the problem is being investigated.

As yet another example, suppose the entity that registered the domain has a malicious intent. In such a scenario, the non-compliance of the domain with a policy (e.g., hosting malicious executables) would be detected at 604. Unlike the bank employee, the malicious individual would not be motivated to make the site secure, and could have DNS services automatically shut off at 606 after a period of time elapsed with the problem not being corrected. Or, depending on the severity of the non-compliance, DNS services could be shut off immediately. Other factors, such as the length of time the domain has been registered, the organizational size of the domain owner, and the level of verification performed on the organization, can be taken into account when determining the responsive actions taken at 606. For example, an individual who recently registered a domain that is found to be non-compliant at 604 can be given significantly less time to correct the problems prior to having DNS services shut off than a verified Fortune 500 company who registered the domain more than a year ago.

Outsourced Model

Suppose .mail registry 110 has contracted with registrar 106 (or another appropriate entity) to provide domain policy enforcement services on behalf of the .mail TLD. As explained above, nameserver 144 is authoritative for the ".mail" TLD and nameserver 146 is authoritative for a reserved zone "_policy.mail." Also explained above, when a DPF aware client, such as browser application 154 attempts to make a connection to a domain belonging to a higher trust TLD, it makes two parallel DNS requests—one for advisors-.mail and one for advisors_policy.mail. In various embodiments, registrar 106 collects logs from nameserver 146 and has one or more log processors examine those logs for new domains. As with log processor 416, newly discovered domains are placed in a queue for processing by scanning engine 122 (or by an alternate scanning engine operated by an entity other than registrar 106, as applicable). As with portion 606 of process 600, one or more responsive actions are taken in response to the scanning results, such as by sending an email to the owner of the secondary domain under .mail, asking the owner of the site to log into an interface provided by registry 110 (e.g., a portal interface 142 reachable from an interface to registry 110).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
 receive input including a secondary domain that is under a higher level domain, wherein the higher level domain is authoritative over domains under the higher level domain, including the secondary domain;
 determine whether a resource associated with the secondary domain that is under the higher level domain adheres with a set of minimum security requirements defined by a compliance policy associated with the higher level domain; and
 in response to the determination, perform a responsive action; and
a memory coupled to the processor and configured to provide the processor with instructions.

2. The system of claim 1 wherein the processor is further configured to determine whether the resource is consistent with a policy associated with the secondary domain.

3. The system of claim 1 wherein the input is received in response to a DNS query.

4. The system of claim 1 wherein the input is collected from a nameserver.

5. The system of claim 1 wherein the processor is configured to receive the input and perform the determination in conjunction with a batch process.

6. The system of claim 1 wherein the secondary domain comprises a second level domain and the higher level domain comprises a top level domain, and wherein the set of minimum security requirements is applicable to all second level domains under the top level domain.

7. The system of claim 1 wherein the determining includes determining whether a zone is DNSSEC signed.

8. The system of claim 1 wherein the determining includes determining a version of Transport Layer Security (TLS).

9. The system of claim 1 wherein the processor is further configured to scan the resource for a presence of a malicious element.

10. The system of claim 1 wherein performing the responsive action includes alerting a domain technical contact.

11. The system of claim 1 wherein performing the responsive action includes causing a DNS request for the second level domain to fail.

12. A method, comprising:
receiving input including a secondary domain that is under a higher level domain, wherein the higher level domain is authoritative over domains under the higher level domain, including the secondary domain;
determining, using a computer processor, whether a resource associated with the secondary domain that is under the higher level domain adheres with a set of minimum security requirements defined by a compliance policy associated with the higher level domain; and
in response to the determination, performing a responsive action.

13. The method of claim 12 further comprising determining whether the resource is consistent with a policy associated with the secondary domain.

14. The method of claim 12 wherein the input is received in response to a DNS query.

15. The method of claim 12 wherein the input is collected from a nameserver.

16. The method of claim 12 wherein the input is received and the determination is performed in conjunction with a batch process.

17. The method of claim 12 wherein the secondary domain comprises a second level domain and the higher level domain comprises a top level domain, and wherein the set of minimum security requirements is applicable to all second level domains under the top level domain.

18. The method of claim 12 wherein the determining includes determining whether a zone is DNSSEC signed.

19. The method of claim 12 wherein the determining includes determining a version of Transport Layer Security (TLS).

20. The method of claim 12 further comprising scanning the resource for a presence of a malicious element.

21. The method of claim 12 wherein performing the responsive action includes alerting a domain technical contact.

22. The method of claim 12 wherein performing the responsive action includes causing a DNS request for the second level domain to fail.

\* \* \* \* \*